Sept. 27, 1949.　　　　E. W. COOPER　　　　2,482,841

METHOD OF MAKING STRETCHING MACHINE JAWS

Filed March 11, 1944

INVENTOR.
BY Ellis W. Cooper
Lynn R. Latta
His Attorney

Patented Sept. 27, 1949

2,482,841

UNITED STATES PATENT OFFICE 2,482,841

METHOD OF MAKING STRETCHING MACHINE JAWS

Ellis W. Cooper, Los Angeles, Calif., assignor to North American Aviation, Inc., Inglewood, Calif., a corporation of Delaware Application March 11, 1944, Serial No. 526,115

6 Claims. (Cl. 29—148)

This invention relates to the art of making jaws for stretching machines of the type adapted to stretch extruded structural members so as to increase their tensile strength. It has been discovered that by stretching structural members such as those used in forming the wing ribs of aircraft that a very considerable increase in tensile strength is obtained. The structural member may be given the proper airfoil shape in the stretching operation.

The lengths of structural material are attached to the stretching members of the press by means of jaws which grip the end portions of such structural members. Because of the extremely high tension loads imposed upon the structural members in the stretching operation, these jaws must be constructed so as to firmly grip a large portion of the cross-sectional area of each end portion of a structural member. It is found that if any considerable area is not engaged by the jaws, the corresponding portion of the structural member may not be stretched as much as those portions that are directly in the line of pull of the engaging portions of the jaws.

In order to secure adequate grip, the jaw facings must be formed with teeth. These teeth are formed by cross-grooving the facings. They must be extremely hard, and it is customary to employ tool steel, which is usually hardened. In the past it has been customary to machine each jaw from a single block of tool steel. The cost of producing in this manner a set of jaws having facings corresponding to the various cross-sectional shapes of the extruded members to be stretched, may run to a considerable amount in view of the necessity for accurately fitting the jaw facings to the cross-sectional shape of the extruded members. The cross grooving of the facings becomes a considerable problem.

The present invention contemplates a method of making the jaws, which reduces the expense thereof very considerably, and at the same time provides greater accuracy of conformity of the jaw gripping surfaces to the cross-sectional shape of the extruded member, than is possible under old methods. Another object is to provide a method whereby the major portion of a set of worn jaws may be salvaged and incorporated into a new set of jaws.

In the drawings, like reference characters designate similar parts in the several views.

Figure 1:
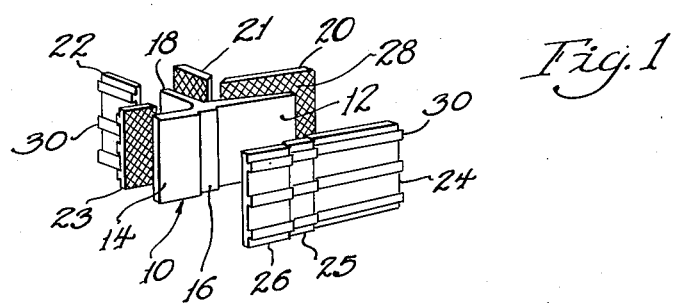
Fig. 1 is a perspective exploded view of a section of an extruded shape, with a set of jaws facings fitted thereto preparatory to molding into a set of jaws.
Figure 2:
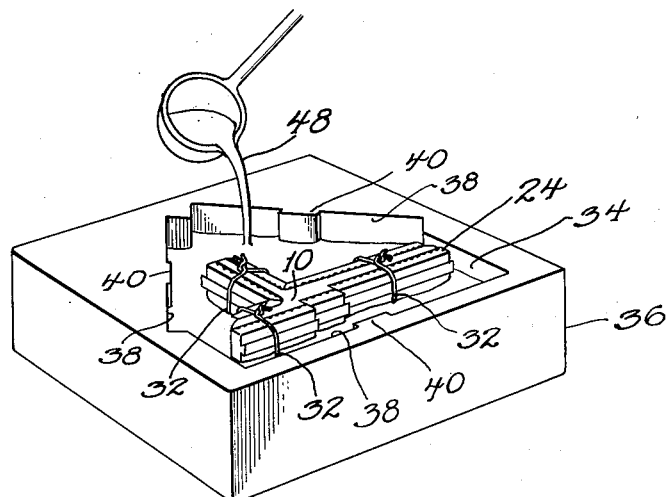
Fig. 2 is a perspective view illustrating the method of making a set of jaws in accordance with my invention.

As an example of one manner in which the invention may be practiced, I have shown in the drawings a method of producing a set of three jaws for engaging a T-shaped extrusion. The first step in the process is to prepare a short section of such extrusion, which is indicated generally at 10 in Fig. 1. The particular extruded shape shown by way of example includes a main flange 12, a flange 14 parallel to the flange 12 but offset from the plane thereof, with a stepped portion 16 lying between the two flanges, and a transverse flange 18.

The second step in the process is to form a set of jaw facings 20, 21, 22, 23, 24, 25 and 26, adapted to fit the respective faces of the portions 12, 14, 16 and 18. The facings 20—26 are each serrated on one side to provide teeth 28 for engaging the surfaces of the flanges 12, 14 and 18, and on the opposite side are provided with anchor beads 30, of dove-tail cross section. Since each of the facings is a simple flat plate, the machining of the serrations which produce the teeth 28, and the machining of the beads 30 are relatively simple and inexpensive operations.

In the next step of the operation, the facings 20—26 respectively are secured in place against the respective faces of the extrusion section 10. A simple method of doing this is to bind the facings with wire loops 32 wrapped around each pair of opposed facings and the flange member embraced therebetween. Any other suitable means for temporarily securing the facings to the extrusion, may be employed.

In the next step of the process, the bundle comprising the extrusion section 10 and the facings attached thereto, is placed in the mold cavity 34 of a mold 36. The cavity 34 has three main faces 38, adapted to define, together with the extrusion and facing package, three spaces of the proper shape to form three jaw sections A, B and C respectively. Each face 38 is provided with a central, vertical bead 40 adapted to form, in its respective jaw, an impression 42 for locating an attaching rib 44 which is later secured to the respective jaw as by means of screws 46.

The next step in the process is to pour molten metal 48 into the mold cavity 34, filling the spaces between the bundle of jaw facings and the sides of the mold to form a casting in which the facings 20—26 are securely anchored by the beads 30. The sides 38 of the mold cavity converge toward the bottom of the mold box 36. This facilitates removal of the casting from the mold. It also provides faces 50 on the jaws A, B and C which diverge in the direction of pull in the stretching machine, and which are adapted to cooperate with similarly diverging faces in the chuck members of the stretching machine (not shown) so as to produce a wedging action which tightens the jaws against the extrusion under the pull of the machine. The faces 50 take the load so that the ribs 44 are required to function only as locators and means for securing the jaws in the chuck when the load is removed from the jaws.

While the invention contemplates the use of any suitable casting material, I find that Kirksite metal is particularly adaptable to the purposes of the invention, and has the necessary strength to endure the heavy loads to which the jaws are submitted in service.

Figure 3:
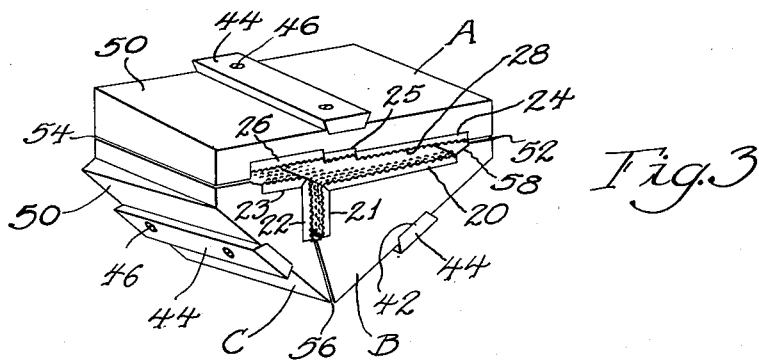
Fig. 3 is a perspective view of a set of jaws that have been constructed in accordance with the invention.

The next step in the process, after the casting has been removed from the mold, is to saw (as at 52, 54 and 56) through the corners of the casting to the extremities of the three flanges 12, 14 and 18 of the extrusion section, thus separating the casting into the three separate jaws A, B and C. The jaws A, B, and C are thereupon removed from the extrusion member 10 and, in the illustration in Fig. 3, are shown re-assembled with the extrusion section 10 removed. Surfaces of the jaws which have been formed by direct contact of the molten metal with the extrusion section 10 (as at 58) are then undercut so as to avoid interference with full engagement of the extrusion surfaces by the jaw teeth 28. The protruding portions of the loops 32 are likewise machined off, leaving the side portions of the loops imbedded in the jaws, and the ribs 44 are then attached. The jaws are then ready to be installed in the extruding machine chuck.

The foregoing may be taken as illustrative of one form in which the invention may be embodied, it being our intention to cover in our claims the use of any equivalent arrangement or apparatus.

I claim as my invention:

1. A method of fabricating a set of jaws for engaging a member of irregular cross-sectional shape which includes the following steps: preparing a short section of said member; forming independent jaw facings fitting the respective faces of said section, temporarily binding said facings in contact with said respective faces; inserting the bundle thus formed into a mold cavity; pouring a molten casting material into said cavity and around said bundle to form a casting integral with said facings; removing the casting thus formed from the mold cavity; separating it into independent jaw bodies; and machining said jaw bodies to form the finished jaws.

2. A method of forming a set of jaws' for engaging a member of irregular cross section which includes the following steps: preparing a short section of said member; forming a plurality of independent jaw facings of hardened material to fit the various faces of said member; serrating each facing on one side to provide engaging teeth, temporarily binding said facings and section into a bundle with each facing in its proper place in engagement with a corresponding face of said section; inserting said bundle into a mold cavity shaped so as to provide a plurality of jaw bodies; pouring molten metal into said cavity to form a casting which may be separated into the respective jaw bodies; allowing the casting to solidify and then removing it from the mold cavity; splitting the casting into separate jaw bodies, each having a facing or a plurality of facings cast therein; and then performing finishing operations on the separate jaw bodies to form a set of jaws.

3. A method of forming a set of jaws for clamping an end portion of an extruded member of irregular shape in a stretching press which comprises the following steps: preparing a short section of said extruded member; preparing a number of independent jaw facings to correspond to the several faces of said extruded section; forming engaging teeth on one side of each facing; forming anchor projections on the opposite side of each facing; binding the facings and said prepared section into a bundle with each facing in its proper place in engagement with a corresponding face of the section; placing said bundle in a mold cavity properly shaped to form a casting which may be split into separate jaw bodies each having facings cast therein; pouring molten casting metal into said cavity to form said casting; removing the casting from the mold cavity; severing the casting into the separate jaw bodies each containing one or more facings cast integral therewith; and performing finishing operations on said jaw bodies to form the set of jaws.

4. A method of forming a set of jaws for clamping an end portion of an extruded member of irregular shape in a stretching press which comprises the following steps: preparing a short section of said extruded member; preparing a number of independent jaw facings to correspond to the several faces of said extruded section; forming engaging teeth on one side of each facing; forming anchor projections on the opposite side of each facing; binding the facings and said prepared section into a bundle with each facing in its proper place in engagement with a corresponding face of the section; placing said bundle in a mold cavity properly shaped to form a casting which may be split into separate jaw bodies each having facings cast therein; pouring molten casting metal into said cavity to form said casting; removing the casting from the mold cavity; and severing the casting into the separate jaw bodies each containing one or more facings cast integral therewith.

5. A method of forming a set of jaws for a stretching press in which extruded members are stretched and formed, which comprises: preparing a short section of the extruded member; preparing a plurality of independent jaw facings of hardened steel to fit the several faces of said extruded sections, each facing having on one side a plurality of engaging teeth and on its opposite side a plurality of anchor projections adapted to be embedded in a casting material; binding the facing and the extruded section into a bundle with each facing in its proper engaging relation to the extruded section, by means of temporary binding means; inserting the bundle into a mold cavity properly shaped to form a casting which may be split into a plurality of jaw bodies each having a facing or plurality of facings secured thereto by the embedding of said anchor projection in the casting material; pouring molten Kirksite into the mold cavity to the level of the top of the bundle; permitting the Kirksite to solidify into a casting; removing the casting from the mold; splitting the casting into a plurality of jaw bodies each having a facing or a plurality of facings cast thereinto; and then performing finishing operations on the jaw bodies to produce the finished jaw members.

6. A method of fabricating a set of jaws for engaging a member of irregular cross-sectional shape including the following steps: preparing a short section of said member; forming a plurality of independent jaw facings to fit the respective faces of said section; arranging said facings in engagement with said section in a mold cavity; pouring molten metal in said cavity to form a casting integral with said facings; and separating the casting into a plurality of jaw members.

ELLIS W. COOPER.

REFERENCES CITED

The following references are of record in the file of this patent:

UNITED STATES PATENTS

| Number | Name | Date |
|---|---|---|
| 370,744 | Mixer | Sept. 27, 1887 |
| 867,036 | Hanford | Sept. 24, 1907 |
| 1,009,970 | Hyle | Nov. 28, 1911 |
| 1,400,701 | Vreeland | Dec. 20, 1921 |
| 1,731,514 | Welcome | Oct. 15, 1929 |
| 1,959,925 | Pryde | May 22, 1934 |
| 2,079,213 | Ingersoll | May 4, 1937 |
| 2,102,394 | Trembour | Dec. 14, 1937 |
| 2,133,291 | Gordon | Oct. 18, 1938 |
| 2,144,146 | Driscoll | Jan. 17, 1939 |